United States Patent [19]

Schauder

[11] Patent Number: 5,168,204
[45] Date of Patent: Dec. 1, 1992

[54] AUTOMATIC MOTOR TORQUE AND FLUX CONTROLLER FOR BATTERY-POWERED VEHICLE DRIVE

[75] Inventor: Colin D. Schauder, Murrysville Boro, Pa.

[73] Assignee: Westinghouse Electric Corp., Pittsburgh, Pa.

[21] Appl. No.: 870,645

[22] Filed: Apr. 16, 1992

[51] Int. Cl.[5] .................................................. H02P 5/40
[52] U.S. Cl. .................................... 318/800; 318/798; 318/803; 318/806
[58] Field of Search .................... 318/560–630, 318/139, 430, 800–825, 433, 432, 798, 799

[56] References Cited

U.S. PATENT DOCUMENTS

| | | | |
|---|---|---|---|
| 4,281,276 | 7/1981 | Cutler et al. | 318/803 |
| 4,418,308 | 11/1983 | Bose | 318/803 |
| 4,442,393 | 4/1984 | Abbondanti | 318/802 |
| 4,453,116 | 6/1984 | Bose | 318/802 X |
| 4,479,082 | 10/1984 | Schauder et al. | |
| 4,484,126 | 11/1984 | Fulton et al. | 318/800 |
| 4,683,412 | 7/1987 | Bialek et al. | 318/798 |
| 4,697,131 | 9/1987 | Schauder et al. | |
| 4,707,651 | 11/1987 | Schauder. | |
| 4,713,745 | 12/1987 | Schauder. | |
| 4,862,054 | 8/1989 | Schauder. | |
| 4,885,518 | 12/1989 | Schauder | 318/798 |
| 4,959,602 | 9/1990 | Scott et al. | |
| 4,962,339 | 10/1990 | Schauder | 318/798 |
| 5,005,115 | 4/1991 | Schauder. | |

Primary Examiner—Paul Ip

[57] ABSTRACT

A motor torque and flux controller usable with a battery-powered vehicle drive regulates the flux in the drive motor so that a constant fraction of available battery voltage is used throughout the constant-power operating range. The controller is responsive to a scalar voltage reference signal and a torque demand reference signal to produce direct and quadrature components of a current demand vector as well as a signal representative of rotor slip. Feedback for the controller is provided by a scalar signal preferably representative of a fraction of the demanded motor terminal voltage. The controller limits the magnitude of the current demand vector to a predetermined maximum while providing flux dominance.

11 Claims, 3 Drawing Sheets

AUTOMATIC MOTOR TORQUE AND FLUX CONTROLLER FOR BATTERY-POWERED VEHICLE DRIVE

BACKGROUND OF THE INVENTION

1. Field of the Invention

The present invention generally relates to the control of AC induction motor drives requiring a constant-power operating range, such as a battery-powered vehicle drive. More particularly, the invention relates to a motor torque and flux controller usable with such a drive.

2. Description of the Prior Art

The development of practical battery-powered vehicles for widespread use has presented a number of substantial technical challenges. Specifically, the realization of desired operating characteristics is greatly complicated by the fact that these vehicles are powered by on-board storage batteries. This is because the voltage available from the batteries varies significantly depending on state of charge. Also, storage batteries are known to have appreciable source resistance. Thus, the available voltage is also dependent on the load.

A battery-powered vehicle is an example of a drive application requiring a constant power operating range. Such applications must have a constant maximum torque capability up to some "base speed." Above base speed, the maximum torque capability drops off inversely as speed is increased. In the motor, this corresponds to operating with full rated flux up to the base speed, at which point the terminal voltage reaches its desired maximum value. Above base speed, the motor flux must be reduced so that the terminal voltage does not rise any further. Assuming a constant maximum current capability, this insures that approximately constant power is supplied to the motor above base speed.

Constant-power applications have been implemented in modern drive systems utilizing a technique known as "vector control." In these systems, actual motor conditions are typically compared with instantaneous demand signals. Error signals thus produced are processed and converted to polyphase currents needed by the motor to produce a desired torque and magnetic flux density. Vector control theoretically offers the possibility of separately controlling the torque and flux with no cross coupling. The ideal form of this control can be realized provided that some means exist to inject the desired currents into the stator winding, and also provided that the rotor circuit time constant ($T_2$) is precisely known. In practice, these conditions are never exactly met.

In the case of a battery-powered vehicle, it is even more difficult to provide the constant-power range. The objective in this case is to accelerate the vehicle as rapidly as possible under whatever battery condition prevails. Since the available voltage varies so widely, a constant flux versus speed characteristic has been found to be impractical.

SUMMARY OF THE INVENTION

The invention provides a torque and flux controller usable with a battery-powered vehicle drive that regulates the flux in the drive motor so that a constant fraction of the available voltage is used throughout the constant-power range. This fraction remains constant even as the available voltage changes. Maximum utilization of the battery power capability is thus ensured under all conditions. As such, acceleration and deceleration times of the vehicle are minimized. The controller of the invention is largely insensitive to errors in the assumed value of $T_2$. Thus, constant flux is maintained in the motor until the sagging available voltage almost meets the rising motor voltage. Thereafter, this condition is maintained at higher speeds. When operating in a regenerative mode, the maximum available voltage rises. To take advantage of this, the motor flux is raised accordingly.

Motor torque and flux controllers practicing the present invention function to produce a current demand vector signal rotating in a synchronous reference frame. Also produced is a signal representative of the slip of the synchronous reference frame relative to the angular position of the rotor. To produce these output signals, the controller is responsive to a voltage demand reference signal and a torque demand reference signal. The voltage demand reference signal is compared with a signal representative of the magnitude of the motor terminal voltage. Preferably, this signal is derived from a motor voltage demand vector signal providing a reference for a pulse-width modulated inverter. The error signal thus produced is preferably passed through a proportional plus integral compensation to give a direct component of the current demand vector signal. The torque demand reference signal forms a basis for the quadrature component of the current demand vector signal, which is easily obtained. The direct component signal may be filtered to obtain a flux demand signal. This flux demand signal, when divided into the torque demand reference signal, produces the rotor slip signal.

In order to ensure optimal performance, the controller includes limiting means to prevent demands from exceeding maximum available values. Additionally, means are provided to operate the controller with constant motor flux below base speed.

DETAILED DESCRIPTION OF PRESENTLY PREFERRED EMBODIMENTS

In accordance with the invention, a motor torque and flux controller providing a constant-power operating range may be constructed. The controller is usable with a battery-powered vehicle drive, such as that illustrated in a concurrently filed application Ser. No. 07/870,643, entitled "Reconfigurable AC Induction Motor Drive for Battery-Powered Vehicle," by Colin D. Schauder, incorporated herein by reference. The controller provides the constant-power operating range by dynamically regulating the motor flux to use a constant fraction of the available voltage. Additionally, the controller is largely insensitive to motor parameters and automatically compensates for regulation due to battery resistance and state of charge. Thus, maximum utilization of the battery capability is achieved.

Figure 1:
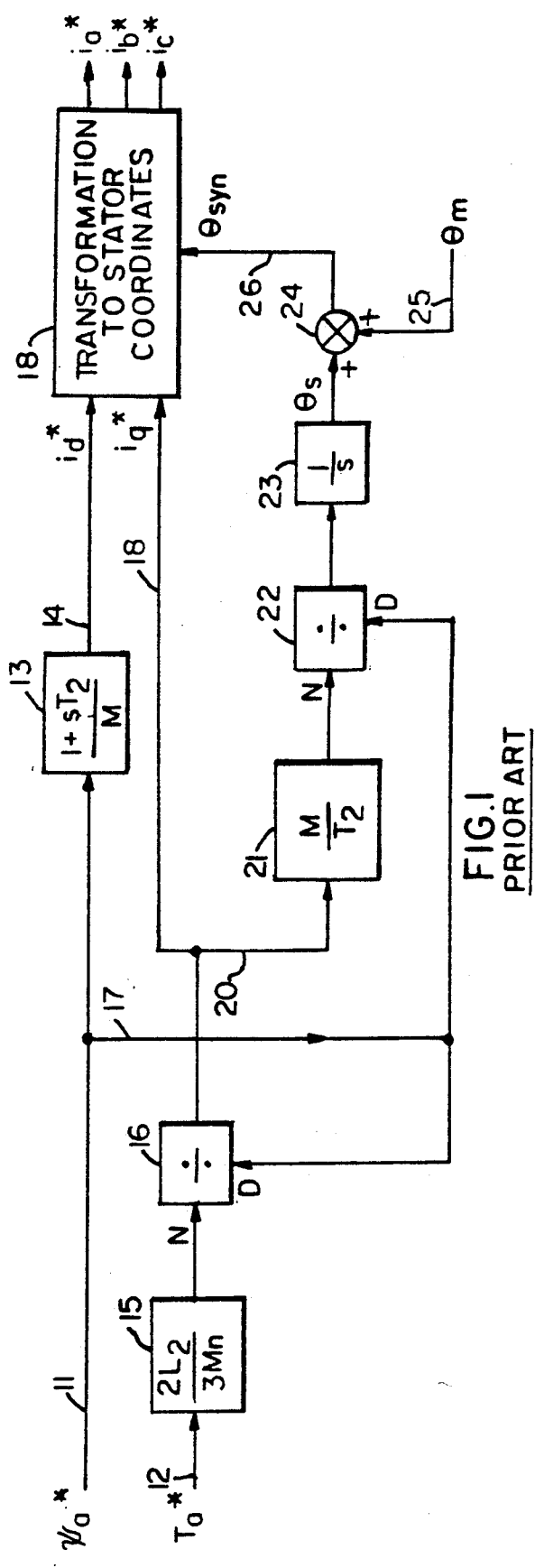
FIG. 1 is a diagrammatic representation of an AC induction motor drive embodying a motor torque and flux controller system as seen in the prior art.

Referring to FIG. 1, a prior art vector control scheme for a three-phase AC induction motor drive is illustrated. Systems of this type are discussed in U.S. Pat. No. 4,885,518, Dec. 5, 1989, incorporated herein by reference. Flux demand signal $\psi_a^*$ and torque demand signal $T_a^*$ are received on lines 11 and 12, respectively. A transfer function 13, having an S-domain characteristic of $(1+sT_2)/M$, where M is the mutual inductance between the stator and the rotor, receives signal $\psi_a^*$. This provides on line 14 direct component signal $i_d^*$. Torque demand signal $T_a^*$ is scaled by scalar 15 and input as the numerator into divider 16. Scalar 15 has a transfer characteristic given by the formula $(2L_2)/(3Mn)$, where factor $L_2$ is the rotor inductance, and the factor n is the number of motor pole pairs. The denominator of divider 16 is signal $\psi_a^*$, which is provided via line 17. This produces on line 18 the quadrature component signal $i_q^*$. Components $i_d^*$ and $i_q^*$ represent cartesian coordinates of the stator current demand vector signal i* in a synchronously rotating reference frame.

Figure 2A:
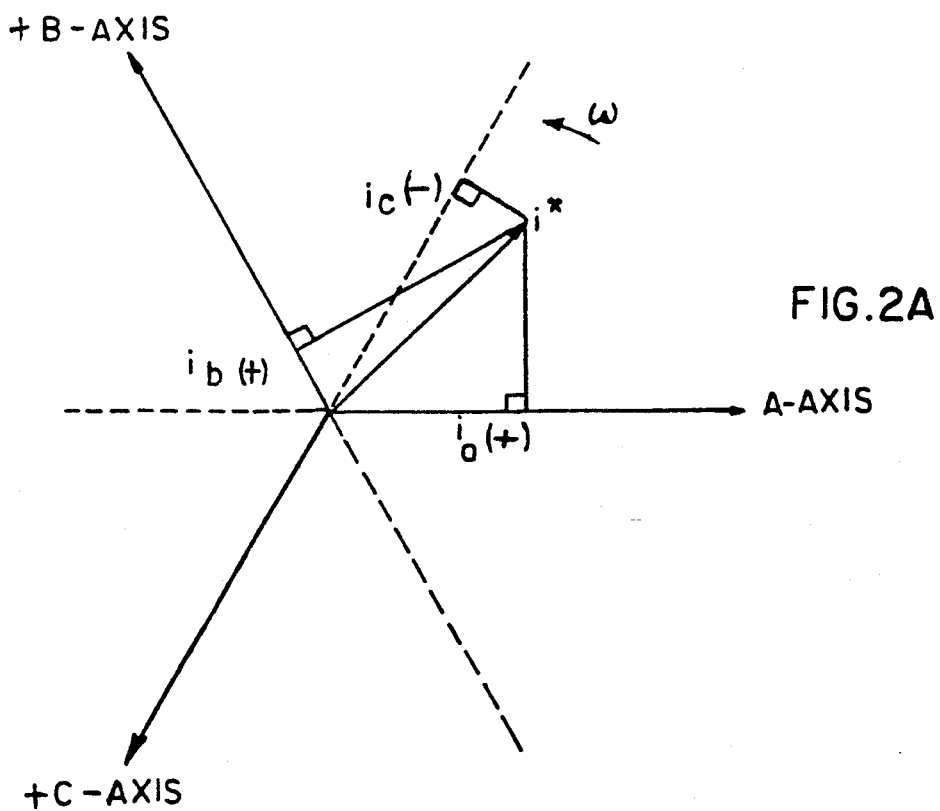
FIG. 2A is a vector representation of a three-phase instantaneous current demand set in terms of the phase variables.
Figure 2B:
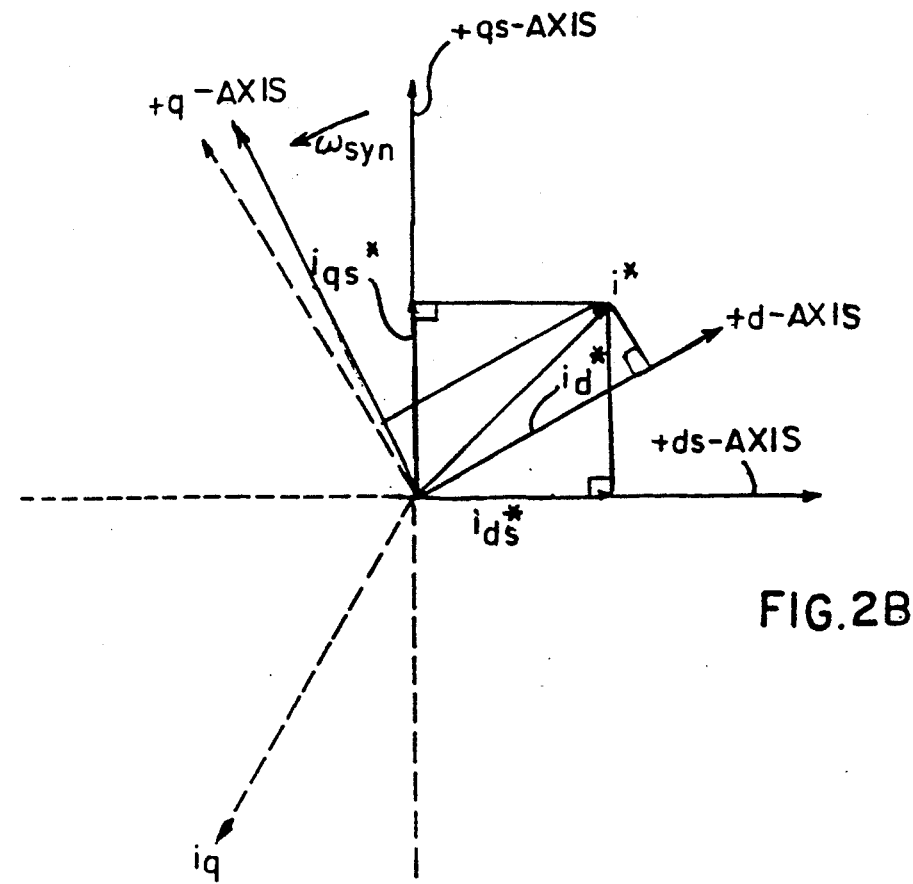
FIG. 2B is a graphical representation of the current demand vector of FIG. 2A in terms of cartesian components in a stationary reference frame and further illustrating the same current demand vector in a rotating reference frame.

The concept of a rotating axis transformation can be best understood with reference to FIGS. 2A and 2B. It is known that three instantaneous phase currents in an AC induction motor may be represented by a single vector (or complex number) in a two dimensional plane. The three phase currents represented by this vector are, by definition, equal to the vertical projections of the vector onto each of three axes (A, B, C) symmetrically arranged at 120 degrees to each other in the complex plane. Under balanced sinusoidal conditions, the current vector rotates about the origin of axes A, B, C with an angular frequency $\omega$ equal to the AC frequency (expressed in rad/sec). Thus, as shown in FIG. 2A, current demand vector signal i* also rotates at angular frequency $\omega$ about the origin of axes A, B, C. The respective phase components of signal i* are current demand phase signals $i_a^*$, $i_b^*$, and $i_c^*$.

In FIG. 2B, the current demand vector signal i* seen in FIG. 2A is redefined in terms of a direct stationary (ds) axis and an orthogonal quadrature stationary (qs) axis to have components $i_{ds}^*$ and $i_{qs}^*$, respectively. Thus, a vector signal which was previously defined in terms of three variables is now defined in terms of two. This relationship is illustrated mathematically as follows:

$$\begin{bmatrix} i_{ds}^* \\ i_{qs}^* \end{bmatrix} = \begin{bmatrix} 1 & 0 \\ \frac{-1}{\sqrt{3}} & \frac{-2}{\sqrt{3}} \end{bmatrix} \begin{bmatrix} i_a^* \\ i_c^* \end{bmatrix}$$

The two components, $i_{ds}^*$ and $i_{qs}^*$, can be regarded as the real and imaginary parts of a complex number, respectively. The current demand vector signal i* is thus defined as $i^* = (i_{ds}^* + j i_{qs}^*)$. As stated above, under balanced sinusoidal conditions, the current demand vector signal rotates in the complex plane with angular frequency $\omega$ equal to the excitation frequency. Under this condition, $i^* = i_o^* e^{j\omega t}$ where $i_o^*$ is a complex constant.

Multiplication of the vector signal i* by a complex quantity $e^{-j\omega_{syn}t}$ yields the complex quantity $i^{*'} = i_o^* e^{j(\omega - \omega_{syn})t}$. This is equivalent, in effect, to rotating two coordinate axes of the complex plane with angular frequency $\omega_{syn}$ and then expressing the vector signed i* in terms of its coordinates ($i_d^*$, $i_q^*$) relative to the new rotating axes. If the rotational frequency, $\omega_{syn}$, of the reference frame is equal to the rotational frequency, $\omega$, of the current demand vector signal i*, then the current vector $i^{*'}$ becomes a complex constant $i_o$. To convert signals $i_dI$ and $i_q^*$ back to the instantaneous three-phase coordinates needed to drive the motor, the following transformation may be used:

If $i^{*'} = (i_d^* + ji_q^*)$, then $$\begin{bmatrix} i_a^* \\ i_c^* \end{bmatrix} = \begin{bmatrix} \cos(\omega_{syn}t) & -\sin(\omega_{syn}t) \\ \cos\left(\omega_{syn}t + \frac{2\pi}{3}\right) & -\sin\left(\omega_{syn}t + \frac{2\pi}{3}\right) \end{bmatrix} \begin{bmatrix} i_d^* \\ i_q^* \end{bmatrix}$$

$$i_b^* = -(i_a^* + i_c^*)$$

This is accomplished in the controller of FIG. 1 by vector current control system 18. In order to make the transformation, however, system 18 requires as an input a rotating reference frame angle signal $\theta_{syn}$. Signal $\theta_{syn}$ is the equivalent of the factor $\omega_{syn}t$ shown in the above matrix. To produce signal $\theta_{syn}$, signal $i_qI$ is fed via line 20 into scalar 21 which has a scaling characteristic $M/T_2$. The output of scalar 21 is fed as a numerator to divider 22. The denominator of divider 22 is signal $\psi_a^*$, which is obtained on line 17. The output of divider 22 is a signal representative of the slip frequency $\omega_s$ of the synchronous reference frame relative to the angular velocity of the rotor. This slip frequency signal is integrated at integrator 23 to obtain an accrued slip angle signal $\theta_s$. Signal $\theta_s$ is then fed to summing junction 24. A rotor position angle signal $\theta_m$, obtained by direct measurement from the rotor shaft, is also fed to summing junction 24 on line 25. The resulting signal on line 26 is signal $\theta_{syn}$.

The system illustrated in FIG. 1, however, is generally undesirable for use in applications requiring a constant-power operating range, such as a battery-powered vehicle drive, for a number of reasons. In providing a constant-power operating range, one of the primary considerations is the choice of base speed. In the case of a battery-powered vehicle drive, the issue resolves itself upon a determination of how closely the motor voltage should be allowed to approach the maximum voltage available from the power inverters which convert DC from the storage batteries to the three-phase AC typically needed by the drive motor. With widely varying source voltage, however, it will generally not be possible to choose $\psi_a^*$ as a simple function of speed so as to obtain full utilization without losing current control.

Another important concern in constant-power range applications is achieving accurate flux control. This is difficult with the scheme of FIG. 1, which is critically dependent on the accuracy of time constant $T_2$. If the value is incorrect, the desired value of flux demand $\psi_a^*$ will not be achieved. When running at high frequency, a very small error in flux $\psi_a^*$ will cause the motor voltage to rise above the maximum available from the power inverters. When this happens, current control will be lost.

Figure 3:
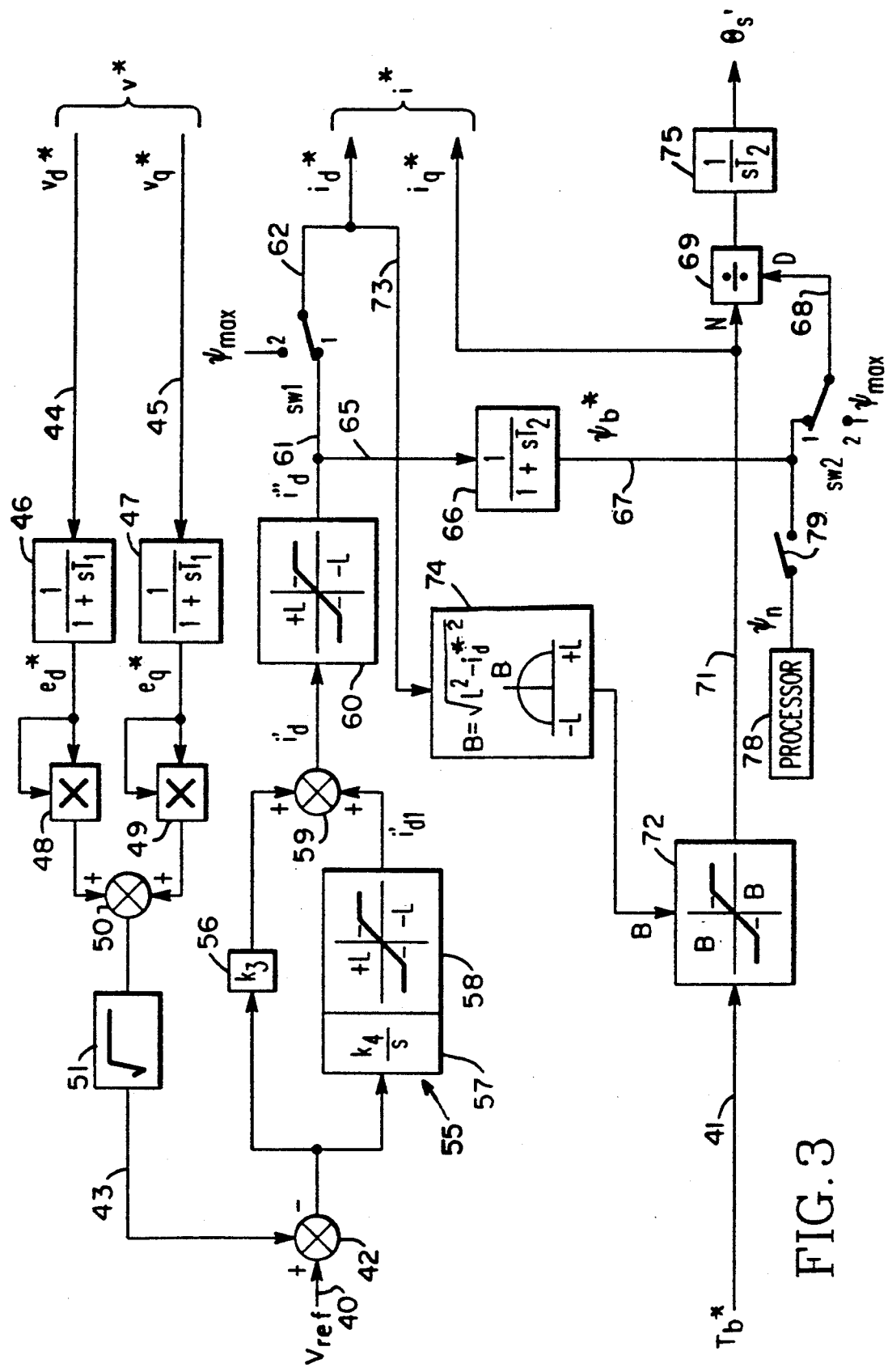
FIG. 3 is a diagrammatic representation of a motor torque and flux controller constructed in accordance with the invention.

FIG. 3 illustrates a motor torque and flux controller of the invention which overcomes many limitations of the prior art. A voltage demand reference signal $V_{ref}$ and torque demand reference signal $T_b*$ are applied to lines 40 and 41, respectively. Signal $V_{ref}$ is a scalar and is compared at differencing junction 42 with a signal appearing on line 43. The signal on line 43 is representative of motor terminal voltage magnitude. This signal is preferably derived from the motor voltage demand vector signal v*, in the synchronously rotating reference frame, taken from the forward path of the vector current control system of the vehicle drive. In this regard, reference is particularly made to FIGS. 1 and 3 of the concurrently filed application to Schauder.

The voltage demand vector signal v* in such a current control system references a pulse-width modulator which may typically be based on the comparison of signal v* with a constant-amplitude triangle wave. As such, signal v* does not represent the absolute value of the motor voltage demanded, but rather a fraction of available voltage being requested. For example, when the amplitude of signal v* covers the full input range of the modulator, then all of the available voltage is being used. This is precisely the characteristic required in the case of a battery-powered drive where the source voltage varies widely. In essence, the feedback signal v* is regulated by means of the present invention to have constant magnitude equal to $V_{ref}$. This insures that a constant fraction of available voltage (which can approach 100%) is always used. This is the desired operating condition in the constant-power operating range.

The direct and quadrature components of signal v* are received on lines 44 and 45, respectively. Signals $v_d*$ and $v_q*$ are preferably then respectively fed to networks 46 and 47 to produce filtered signals $e_d*$ and $e_q*$. Preferably, networks 46 and 47 have identical transfer characteristics of $1/(1+sT_1)$. The time constant $T_1$ is chosen to provide low-pass filtering. Filtered signal $e_d*$ is then squared at multiplier 48. Similarly, signal $e_q*$ is squared at multiplier 49. Outputs of multipliers 48 and 49 are added together at summing junction 50. In accordance with the familiar Pythagorean theorem, the square root of the output of summing junction 50 is taken at network 51 in order to produce the scalar magnitude signal appearing on line 43.

The voltage error signal produced at differencing junction 42 is processed by compensator 55. Compensator 55 is generally a proportional plus integral compensator, having a characteristic of gain $k_3$ at transfer function 56 and an integral characteristic $k_4/s$ ($k_4$ is a constant) at function 57. In order to take account of the practical maximum current available, the maximum output of function 57 is limited by limiting function 58 to a value of positive or negative L, where L is the maximum permissible inverter current. The output of function 58 is designated as signal $i'_{d1}$. An output from function 56 as well as signal $i'_{d2}$ are added together at summing junction 59 to produce signal $i'_d$. The proportional plus integral compensation of compensator 55 provides zero steady state error for motor voltages of frequency $\omega_{syn}$ even if the proportional gain $k_3$ is very low. This is because integrator function 57 provides very high gain (theoretically infinite) for DC error signals in the synchronous reference frame. These signals, in turn, correspond to voltages of frequency $\omega_{syn}$ in the stationary frame. Thus, signal $i'_d$ is itself limited by limiting function 60 to a value within the range of positive to negative L. This produces a signal output on line 61 which may be designated $i''_d$. When switch sw1 is in position 1 as shown, signal $i''_d$ is output on line 62 as eventual current demand direct component signal $i_d*$.

The signal appearing on line 61 is fed via line 65 to network 66. Network 66 is preferably a first order lag network having a characteristic of $1/(1+sT_2)$. The output of network 66, appearing on line 67, is the motor flux demand signal $\psi_b*$. Thus, the signal $i''_d$ serves as a basis for flux demand signal $\psi_b*$. When switch sw2 is in position 1 as shown, signal $\psi_b*$ is fed via line 68 to divider 69 as the denominator.

The numerator signal applied to divider 69 is the current demand signal quadrature component $i_q*$. Signal $i_q*$ is obtained on line 71 by submitting signal $T_b*$ to limiting function 72. Function 72 operates to clamp signal $T_b*$ at limits defined as positive to negative B. The value of B is obtained continuously and instantaneously based on the changing value of signal $i_d*$. To calculate B, signal $i_d*$ is fed by line 73 to calculator 74. Calculator 74 typically comprises a microprocessor containing software having a look-up table programmed into memory. The value of B, which is defined as the square root of the factor $(L^2 - i_d*^2)$, is then easily found.

By instantaneously and continuously calculating the value of B, the value of signal $i_q*$ is maintained at a level such that current demand vector signal i* does not exceed its imposed limit. At the same time, the use of signal $i_d*$ is maximized. Thus, the flux regulating function has first call on all of the current available from the drive inverter. This condition is referred to as "flux dominance."

The output of divider 69 is fed to integrator 75, which has a transfer characteristic of $1/sT_2$. This operation produces signal $\theta_s'$, which represents the slip angle of the synchronous reference frame relative to the rotor. The resulting signal i* and $\theta_s'$ can then be fed to and utilized by a suitable vector current controller, such as that shown in the concurrently filed application, to control instantaneous stator currents.

Figure 4:
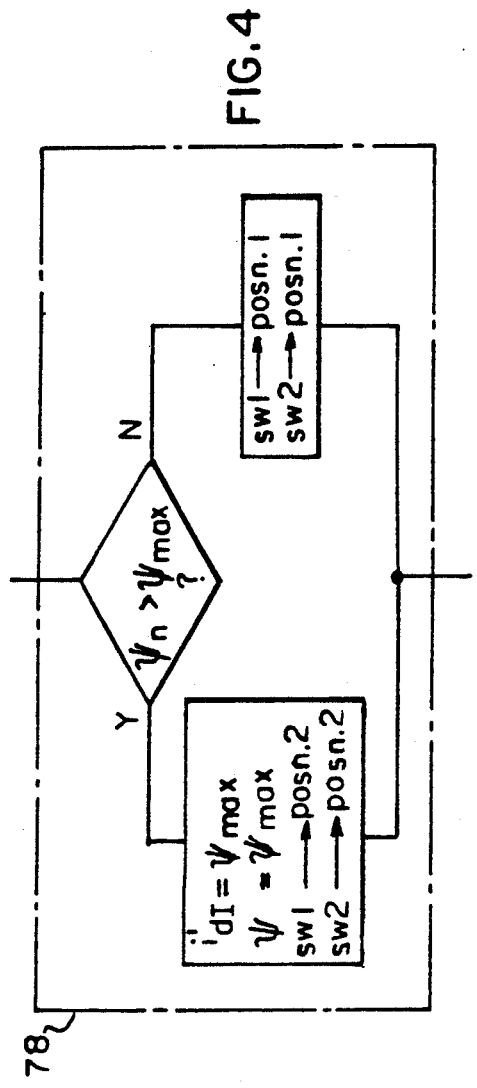
FIG. 4 is a block diagram illustrating means of the invention for providing a transition between constant flux below base speed and variable flux in the constant power operating range.

Switching means are also provided to ensure constant motor flux below base speed. Specifically, the transition between constant flux mode and variable flux mode is achieved by selective operation of switches sw1 and sw2 by processor 78. Flux demand signal $\psi_b*$ is sampled periodically by sampler 79 to produce sampled flux signal $\psi_n$. As shown in FIG. 4, processor 78 first determines whether the sampled signal $\psi_n$ is greater than the full rated flux in the motor, $\psi_{max}$. If signal $\psi_n$ does not exceed $\psi_{max}$, then switches sw1 and sw2 are held in position 1. This corresponds to the variable flux mode. If, however, the value of signal $\psi_n$ exceeds signal $\psi_{max}$, then switches sw1 and sw2 are taken to position 2. Thus, signal $i_d*$ appearing on line 62 is set at the value $\psi_{max}$. The flux demand signal appearing on line 68 is also set at the value of $\psi_{max}$.

The dynamic behavior of the controller of the invention has been studied and shown to be robust and effective under a wide variety of conditions. It serves to regulate the feedback quantity to the desired set value by a combination of two actions. When the value of $T_b*$ is zero, the action is achieved by varying the magnitude of $i_d*$. Under other conditions, the regulating action is obtained mainly by altering the slip frequency of the synchronous reference frame. Using this configuration, $T_2$ is essentially only a time constant appearing in the forward path of a closed-loop controller. Thus, it need not be known with precise accuracy. In simulation, the scheme functioned well with a 50% deviation in the value of $T_2$. It should be noted that in general the rotor flux vector will not coincide with the d-axis of the reference frame unless $T_2$ has the correct value. This does not detract from the steady state or dynamic capability of the drive, so long as the flux control loop is operative with relatively high bandwidth.

It should be noted that signal $T_b^*$ does not represent an absolute torque request in this configuration. Consider the following relationship: Torque $=(3/2)(M^2n/L_2)\psi i_q$. Thus, torque is proportional to the product of $i_q$ and $\psi$. As such, a given value of $i_q$ will represent a different value of torque depending on the prevailing flux.

The invention thus provides a motor torque and flux controller for a battery-powered vehicle drive which effectively controls the drive motor in the variable flux, or field weakening, mode. The controller has the ability to maximize output power despite battery voltage variation and state of charge. Additionally, the invention provides effective means for providing transition to and from the constant flux mode. Although certain preferred embodiments have been described and shown herein, it is to be understood that various other embodiments and modifications can be made within the scope of the following claims.

I claim:

1. A motor torque and flux controller usable in a battery-powered vehicle drive having an AC induction drive motor to produce direct and quadrature component signals of a current demand vector and further to produce a signal representative of rotor slip, said controller comprising:
   switching means for providing selective operation of said controller in a constant flux mode or a variable flux mode;
   feedback means for producing a scalar signal representative of motor terminal voltage magnitude;
   differencing means for producing an error signal based on a difference between said scalar signal and a voltage demand reference signal;
   compensator means for receiving said error signal and producing a flux basis signal, said switching means outputting said flux basis signal in said variable flux mode as said direct component signal;
   means responsive to said switching means for use in said constant flux mode for outputting a maximum flux signal as said direct component signal;
   network means for receiving said flux basis signal and producing a flux demand signal;
   torque demand means for receiving a torque demand signal and producing said quadrature component signal;
   rotor slip means for producing said signal representative of rotor slip, said rotor slip means receiving as an input said quadrature component signal and responsive to said switching means to receive as a further input said flux demand signal in said variable flux mode or said maximum flux signal in said constant flux mode; and
   limiting means for maintaining a magnitude of said current demand vector below a predetermined maximum.

2. The controller of claim 1 wherein said feedback means receives a motor voltage demand vector signal representing a fraction of available drive voltage, and producing therefrom said scalar signal representative of motor terminal voltage magnitude.

3. The controller of claim 2 wherein said voltage demand vector signal is rotating relative to a synchronously rotating reference frame.

4. The controller of claim 3 wherein said feedback means comprises:
   first and second means for respectively receiving a d-axis component signal and a q-axis component signal of said voltage demand vector signal;
   a first filtering network associated with said first means, said first filtering network providing a low-pass filtered d-axis component signal;
   a second filtering network associated with said second means, said second filtering network providing a low-pass filtered q-axis component signal;
   a first multiplier receiving said low-pass filtered d-axis component signal and producing therefrom a first squared output signal;
   a second multiplier receiving said low-pass filtered q-axis component signal and producing therefrom a second squared output signal;
   third means for adding said first and second squared output signals; and
   fourth means for receiving an output signal from said third means and deriving a square root thereof to produce said scalar signal representative of motor terminal voltage magnitude.

5. The controller of claim 1 wherein said switching means comprises:
   a first switch electrically connected on a first first switch side to a direct component signal output and further selectively electrically connectable on a second first switch side between a first switch variable flux mode contact electrically connected to receive said flux basis signal and first switch constant flux mode contact a contact electrically connected to receive said maximum flux signal;
   a second switch electrically connected on a first second switch side to said rotor slip means and further electrically connectable on a second second switch side between a second switch variable flux mode contact electrically connected to receive said flux demand signal and a second switch constant flux mode contact electrically connected to receive said maximum flux signal; and
   a switching processor receiving a signal representative of said flux demand signal and operable to selectively actuate second sides of said first and second switches in said variable flux mode to said variable flux mode contacts or to said constant flux mode contacts in said constant flux mode.

6. The controller of claim 5 wherein said switching means further comprises a periodic sampler sampling said flux demand signal and further wherein said signal representative of said flux demand signal is a sampled flux demand signal.

7. The controller of claim 1 wherein said compensator means comprises a proportional plus integral compensator.

8. The controller of claim 7 wherein said limiting means comprises means for limiting an output of an integral portion of said proportional plus integral controller.

9. The controller of claim 1 wherein said limiting means comprises:
   means for limiting said compensator means to have an output within a range having limits of positive to negative L and flux producing said flux basis signal where L is said predetermined maximum of said current demand vector;

means for limiting said torque demand signal to a value in the range of positive to negative B and thus producing said quadrature component signal, where B is defined as the square root of the difference of $L^2$ minus the square of said direct component signal.

10. The controller of claim 9 wherein said means for limiting said torque demand signal to a value in the range of positive to negative B includes a calculator receiving said direct component signal and instantaneously and continuously calculating the value of B.

11. The controller of claim 10 wherein said calculator comprises a microprocessor having look-up table software programmed into memory.

* * * * *